United States Patent [19]

Schlegel

[11] Patent Number: 4,744,204
[45] Date of Patent: May 17, 1988

[54] APPARATUS FOR STORING PERISHABLES SUCH AS MEAT

[75] Inventor: Jürgen Schlegel, Umkirch, Fed. Rep. of Germany

[73] Assignee: Vesten AG, Stans, Switzerland

[21] Appl. No.: 14,791

[22] Filed: Feb. 13, 1987

Related U.S. Application Data

[63] Continuation-in-part of Ser. No. 559,231, Dec. 8, 1983, Pat. No. 4,659,578.

[30] Foreign Application Priority Data

Dec. 23, 1982 [DE]  Fed. Rep. of Germany ... 8236195[U]
May 20, 1983 [EP]  European Pat. Off. ........ 83105018.2
Jul. 3, 1986 [DE]  Fed. Rep. of Germany ... 8617814[U]

[51] Int. Cl.⁴ .............................................. B65B 63/00
[52] U.S. Cl. ........................................ 53/526; 53/127; 17/32; 100/910; 426/397; 426/513
[58] Field of Search ...................... 17/32; 53/122, 436, 53/523, 526, 527; 100/910; 426/124, 129, 396, 397, 402, 411, 413, 414, 418, 478, 495, 513

[56] References Cited

U.S. PATENT DOCUMENTS

| 1,818,924 | 8/1931 | Basmadjian | 426/124 X |
| 2,528,276 | 10/1950 | Hoy | 100/910 X |
| 2,665,822 | 1/1954 | Crawford | 100/910 X |
| 3,638,554 | 2/1972 | Ackroyd | 100/910 X |
| 3,646,881 | 3/1972 | Rathjen et al. | 100/910 X |
| 3,924,295 | 12/1975 | VerBurg | 17/32 |
| 4,489,035 | 12/1984 | Coffey | 100/910 X |
| 4,534,286 | 8/1985 | Fanzke | 100/910 X |

FOREIGN PATENT DOCUMENTS 370560  4/1932  United Kingdom ................ 100/910

Primary Examiner—Robert L. Spruill
Assistant Examiner—Steven P. Weihrouch
Attorney, Agent, or Firm—Peter K. Kontler

[57] ABSTRACT

Apparatus for storing pieces of fresh meat has a vessel with an open top for insertion or removal of meat and a cover which overlies the meat in the vessel and can be pushed downwardly by a jack so as to pressurize the pieces of meat and expel air by eliminating gaps between neighboring pieces of meat as well as between the pieces of meat and the internal surface of the vessel. Compression of meat results in expulsion of juices which rise and overlie the topmost layer of meat around the cover.

28 Claims, 4 Drawing Sheets

APPARATUS FOR STORING PERISHABLES SUCH AS MEAT

CROSS-REFERENCE TO RELATED CASE

This is a continuation-in-part of the copending patent application Ser. No. 559,231 filed Dec. 8, 1983 for "Method of storing perishables such as meat", now U.S. Pat. No. 4,659,578 issued on Apr. 21 1987.

BACKGROUND OF THE INVENTION

The invention relates generally to apparatus for storing perishables such as meat.

More particularly, the invention relates to apparatus for storing perishables such as meat under pressure.

A more specific aspect of the invention relates to the storage of perishables such as meat under pressure employing a vessel which is provided with a cover. The perishables may be removed from the vessel as required.

Meat is conventionally stored by suspending it in a cooling chamber. However, a weight loss occurs within a relatively short period due to drying of the meat. The outer part of the meat, which is particularly susceptible to drying out, soon becomes inedible and must be removed before the meat is sold. This results in substantial losses.

It has therefore become known to pack meat in synthetic resin or vacuum packages which are then evacuated to obtain a specified vacuum. This, however, involves substantial amounts of labor. Moreover, the materials which are constantly required to make the packages increase costs as does the apparatus required to seal the packages. In addition, there is the problem of deciding how much meat should be included in each package since the amount of meat to be consumed in the future is not known at the time of packaging.

It is further known to store meat in a vessel under pressure. In order to place the meat under pressure, a number of vessels are placed one on top of the other. The vessels have shaped edges which serve to connect the vessels with one another and also serve to limit the height to which the respective vessels can be filled.

In comparison to vacuum packages, for example, the storage of meat in such vessels is substantially improved as regards both cost and maximum possible storage time. However, it has been found in practice that difficulties arise when some of the meat is to be removed from the vessels. The reason is that the required pressure on the meat is achieved only when the vessels are filled to a specific height. After one or more pieces of meat have been removed from a vessel, the required pressure in the vessel can no longer be achieved and it is necessary to replace the pieces of meat which have been removed. Substitution of fresh meat for meat which has been removed cannot be performed satisfactorily in practice since it is then no longer possible to achieve the requisite storage time for the entire meat supply.

The effect to be achieved by pressurization, namely good quality over prolonged storage periods, can only be achieved by filling the vessels precisely to a specified level and maintaining this level constant for the entire storage period. Accordingly, the storage of meat in pressurized vessels is to be employed in large businesses where the entire contents of a vessel can be disposed of at one time. While it is possible to extend the use of pressurized vessels to smaller businesses by employing smaller vessels, this leads to certain difficulties. Furthermore, the cost advantage over vacuum packaging would be reduced, especially as regards the cost of material. In addition, a reduced vessel size would still not fulfill the practical requirements of a butcher shop of average size.

OBJECTS AND SUMMARY OF THE INVENTION

It is an object of the invention to provide an apparatus for storing or preserving perishables such as meat which makes it possible to remove some of the perishables from a vessel under pressure without deleterious effects on the remainder of the perishables in the vessel.

Another object of the invention is to provide an apparatus for storing or preserving perishables such as meat which makes it possible to maintain a desired pressure in a vessel even when some of the perishables are removed from the vessel.

An additional object of the invention is to provide an apparatus for storing or preserving perishables such as meat which makes it possible to maintain a desired pressure in a vessel regardless of the level to which the vessel is filled.

A further object of the invention is to provide an apparatus for storing or preserving perishables such as meat which makes it feasible to employ pressurized vessels for high-volume as well as low-volume businesses.

It is also an object of the invention to provide an apparatus for storing or preserving perishables such as meat which enables the perishables to be stored under pressure relatively economically.

Another object of the invention is to provide an apparatus for storing or preserving perishables such as meat which makes it possible to store a large quantity of perishables under pressure and to remove varying quantities of the perishables as required without losing the advantages of pressurization.

A further object of the invention is to provide an apparatus for storing or preserving perishables such as meat which makes it possible to maintain the quality of the perishables over extended storage periods.

Another object of the invention is to provide an apparatus for storing or preserving perishables such as meat which enables the quality of the perishables to be maintained over extended periods substantially independently of the amount of perishables present.

The invention is embodied in an apparatus for temporary storage of perishables, particularly pieces of raw meat. The apparatus comprises a vessel having a bottom wall and an open top for admission or withdrawal of meat, a cover which is insertable into the vessel by way of the open top so as to overlie the meat therein, and means for applying pressure to the cover from above to thereby pressurize the meat by urging the cover toward the bottom wall of the vessel. The pressure applying means can comprise a mechanism analogous to jacks for lifting portions of motor vehicles.

The pressure applying means can comprise a carrier (e.g., an inverted U-shaped frame) on the vessel, a pressurizing member (e.g., an elongated vertical rod) mounted on the carrier for movement toward and away from the cover in the vessel, a pressure applying member (e.g., a plate) which cooperates with the pressurizing member and abuts the cover from above when the cover is received in the vessel (the plate can be affixed to lower end portion of the rod), and means (e.g., including a pivotable lever) for moving the pressurizing member and the plate relative to the carrier.

In accordance with a presently preferred embodiment of the pressure applying means, the moving means comprises a mounting element on the carrier, a shifting element which is movably supported by the mounting element and has a portion engaging the pressurizing member, and means for moving the shifting element relative to the mounting element. The shifting element can be separably connected with the mounting element and the pressurizing member can be provided with an abutment for the aforementioned portion of the shifting element. The latter can comprise a rod-like second portion which is reciprocable in the mounting element.

The vessel has a rim which surrounds the open top and can include or constitute a reinforced portion. The carrier of the pressure applying means preferably comprises an elongated web and two legs which depend from the end portions of the web and have means for coupling the carrier to the reinforced portion of the vessel. Each coupling means can comprise a rail which is arranged to engage the reinforcing portion from below and a rotary member (e.g., an idler roller) which is arranged to overlie the reinforced portion at a level above the respective rail. The arrangement is preferably such that the coupling means conform, at least substantially, to the adjacent portion of the vessel, preferably to the respective parts of the reinforced portion at the open top of the vessel. At least one of the legs is or can be movably connected to the respective end portion of the web, e.g., by a hinge whose pintle defines a substantially horizontal pivot axis.

That portion of the vessel which contacts the pieces of meat can be made of a high-quality steel or an equivalent alloy, or of a suitable plastic material, preferably a plastic material which is reinforced by glass fibers (e.g., by mats of glass fibers).

The vessel can be provided with means for cooling the pieces of meat in its interior. Such cooling means can comprise at least one coolant-conveying conduit (e.g., a spiral) which is embedded in or is mounted on the vessel. The vessel can comprise an inner layer of steel or plastic material and an outer later of plastic material (particularly a material which is a good insulator of heat), and the cooling means can comprise one or more coolant-conveying conduits between the inner and outer layers. Alternatively, or in addition to the just discussed conduit or conduits, the cooling means can comprise a refrigerating system which is adjacent the bottom wall or one sidewall (e.g., the rear wall) of the vessel.

The cross-sectional area of the space which is defined by the vessel for storage of meat therein preferably decreases in a direction from the open top toward the bottom wall of the vessel. By way of example, one presently preferred vessel can be designed to have the following outer dimensions: a height of approximately 83 cm, a width of approximately 57 cm and a depth of approximately 46 cm.

In accordance with a presently preferred embodiment, the vessel is made of a material which has an elasticity and a thermal expansion coefficient such that the pressure which is applied to pieces of meat in the vessel by the cover remains at least substantially unchanged, or even increases, in response to heating or cooling of the vessel and the resulting thermally induced expansion or contraction of meat in the vessel. The material of such vessel preferably exhibits a low heat conductivity and the vessel is preferably made of or contains a plastic material, preferably a plastic material which is reinforced by glass fibers or the like. For example, the vessel can comprise an outer layer of polyester resin which is reinforced by glass fiber mats and an inner layer on the basis of polyester resin. The inner layer can further contain pigments. Such vessel can contain approximately 60% by weight of polyester resin, approximately 30% by weight of glass fibers and approximately 10% by weight of a cover layer. As mentioned above, the cross-sectional area of the space which is defined by the vessel for storage of meat preferably decreases in a direction from the open top toward the bottom wall. The cover is or can be at least slightly congruent to the bottom wall of the vessel. That side of the cover which faces the bottom wall is preferably provided with at least one substantially centrally located projection which causes expulsion of air from the central portion of the mass of confined perishable material toward the inner sides of the sidewalls of the vessel. Such projection or projections can have a substantially trapezoidal cross-sectional outline or each such projection can be bounded by a convex surface.

That side of the cover which faces away from the bottom wall of the vessel is preferably provided with one or more eccentrically located handles to facilitate lifting of the cover out of the vessel. The eccentric mounting of the handle or handles allows for the application of pressure to the central portion of the upper side of the cover.

The means for applying pressure to the cover which cooperates with the just discussed plastic vessel is or can be identical with the aforediscussed pressure applying means, i.e., the pressure applying means can resemble or include a jack and can be provided with a rod-like pressurizing member whose lower end carries the pressure applying member and which extends through an opening in the central portion of the web of the U-shaped frame which constitutes or forms part of the carrier.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
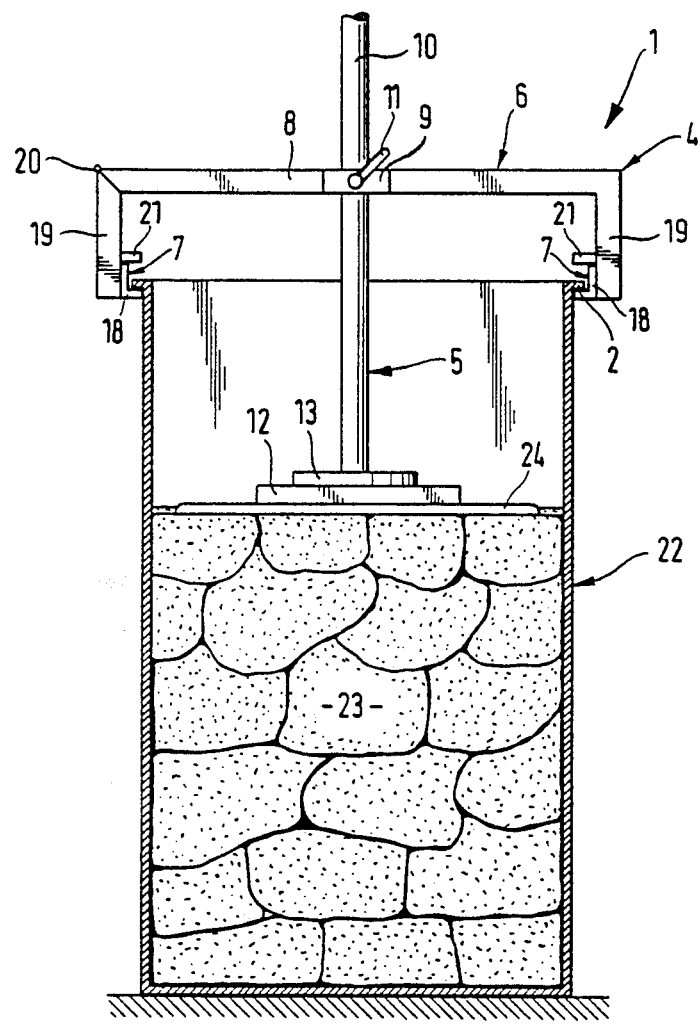
FIG. 1 is a schematic side elevational view of the vessel and pressure applying means in an apparatus embodying one form of the invention.

FIG. 1 shows a vessel 22 for accommodating perishables under pressure. The perishables are here assumed to be in the form of slabs or otherwise shaped pieces 23 of fresh raw meat. The vessel 22 has an open upper end or top via which the pieces 23 are placed into the vessel 22. The interior of the vessel 22 is entirely enclosed except at the open top.

The pieces 23 form a stack or pile in the vessel 22. A cover 24 rests on the upper surface of the stack of pieces 23.

In accordance with a feature of the invention, a pressure applying means indicated generally at 1 is mounted on top of the vessel 22. The pressure applying means 1 presses down on the cover 24 and thereby exerts a compressive force on the pieces 23. The means 1 functions to maintain the pieces 23 under pressure during storage of the pieces 23 in the vessel 22. In this regard, the vessel 22 is a storage vessel for storing or preserving the pieces 23.

Figure 2:
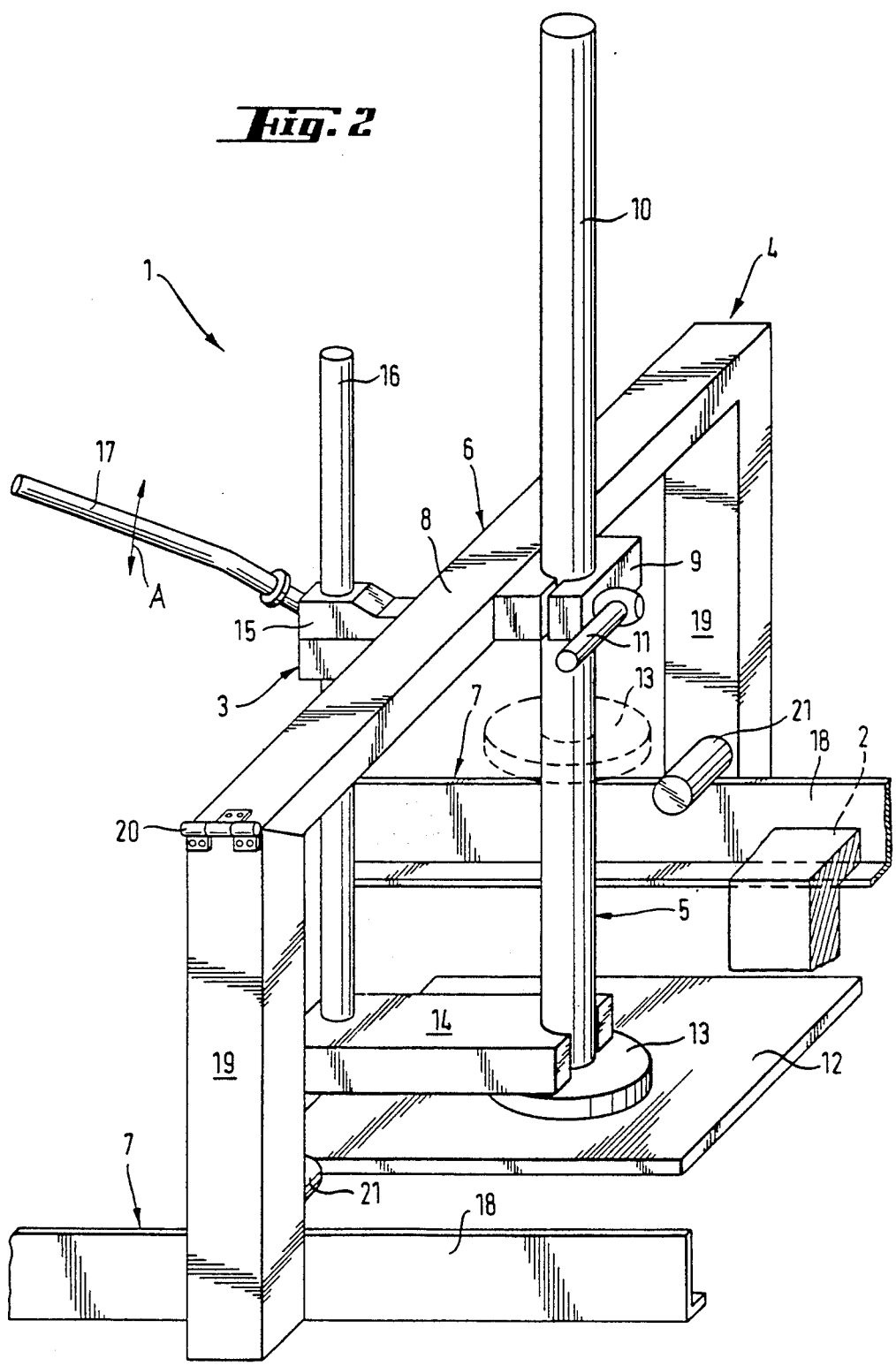
FIG. 2 is a perspective view illustrating details of the pressure applying means in the apparatus of FIG. 1.

FIG. 2 illustrates that the pressure applying means 1 includes a carrier 4 which supports a pressurizing member 5. The pressurizing member 5 is reciprocable in the carrier 4 and is designed to move up-and-down inside the vessel 22 when the means 1 is mounted thereon. The means 1 further comprises an adjusting or displacing mechanism 3 for moving the pressurizing member 5. The adjusting mechanism 3 and the carrier 4 with the pressurizing member 5 constitute two discrete structural units. The adjusting mechanism 3 may be readily connected with and disconnected from the carrier 4 via non-illustrated fastening means such as clamps or bolts. An advantage of using an adjusting mechanism 3 which is a discrete structural unit is that a single adjusting mechanism 3 may then be used to pressurize a large number of vessels. This makes it unnecessary to provide a large number of adjusting mechanisms so that costs may be kept down. In FIG. 1, the adjusting mechanism 3 was removed after pressurizing the pieces 23 in the vessel 22.

Figure 3:
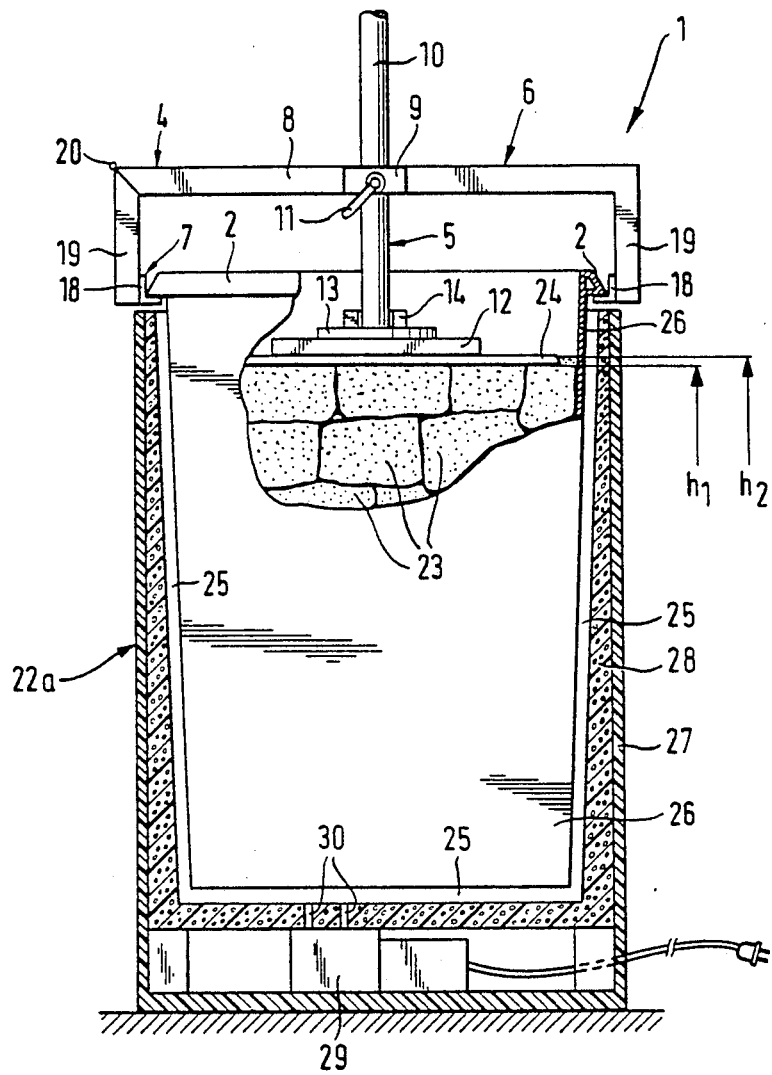
FIG. 3 is a view similar to that of FIG. 1 but showing a modified vessel.

The carrier 4 comprises a substantially U-shaped frame 6 having a pair of legs 19 which are connected by an elongated web 8. A gripping element or coupling 7 is mounted at the free end of each of the legs 19. The function of the gripping elements 7 is to engage the vessel 22 so that the pressure applying means 1 is held on the vessel 22. In the embodiment of FIGS. 1–3, the gripping elements 7 comprise angle grippers 18, that is, the grippers 18 have substantially L-shaped cross sections. The vessel 22 has an outwardly projecting reinforced rim 2 and the short, horizontal sides of the grippers 18 are located below the rim 2 when the means 1 is mounted on the vessel 22.

The vessel 22 is here assumed to be square or rectangular so that the rim 2 may be considered to include several sections each of which extends along one side of the vessel 22. The grippers 18 are designed to engage respective sections of the rim 2 which are located on opposite sides of the vessel 22 and are parallel to one another.

A guide 9 which also functions as a clamp is mounted approximately at the center of the web 8 connecting the legs 19 of the frame 6. The guide 9 has an opening of variable cross-sectional area. A clamping or securing element 11 is mounted on the guide 9 and may comprise a clamping screw.

The pressurizing member 5 comprises a guide rod or holder 10 which is received in the opening of the guide 9. The guide rod 10 is slidable up-and-down in the guide 9 when the clamping element 11 is loosened and may be fixed in any desired position by tightening the clamping element 11.

A plate-like pressure applying member or piston 12 is mounted at the lower end of the guide rod 10. The upper surface of the member 12 carries an abutment 13 which is designed to be engaged by the adjusting mechanism 3. As indicated by broken lines, one or more additional abutments 13 may be mounted on the guide rod 10 at a distance from the pressure applying member 12. The provision of one or more additional abutments 13 may be of advantage when the maximum stroke of the pressurizing member 5 exceeds the maximum stroke of the adjusting mechanism 3.

The pressure applying member 12 is designed to be pushed against the cover 24 in the vessel 22 by the adjusting mechanism 3. The resulting pressurization of the pieces 23 in the vessel 22 may cause juices to be squeezed out of the pieces 23. Generally, downward displacement of the pressure applying member 12 will be limited in such a manner that the pressure applying member 12 does not contact these juices or is immersed in the juices only to a very slight extent. In any event, the design of the pressure applying member 12 is such that it may be readily cleaned.

As illustrated in FIG. 2, the adjusting mechanism 3 is advantageously in the form of a jack such as is used for jacking up cars. The adjusting mechanism 3 includes a mounting element 15 which is designed to be releasably connected with the frame 6 of the carrier 4. The mounting element 15 is arranged to be secured to the web 8 of the frame 6. The adjusting mechanism 3 further includes a shifting element or foot 14 which is designed to engage one of the abutments 13 on the pressurizing member 5. An adjusting rod 16 is fast with the shifting element 14 and is slidably mounted in the mounting element 15 for up-and-down movement. A lever 17 is provided to effect movement of the adjusting rod 16 relative to the mounting element 15. Upon actuation of the lever 17 in the manner indicated by the double-headed arrow A, the adjusting rod 16, and hence the shifting element 14, are displaced downwards relative to the frame 6 so that the shifting element 14 comes to bear against an abutment 13. Continued actuation of the lever 17 then causes the shifting element 14 to push the pressure applying member 12 downwards relative to the frame 6.

The shapes of the gripping elements 7 are preferably complementary to the shape of the vessel 22 and the peripheral configuration of the rim 2. Similarly, it is preferred for the dimensions of the gripping elements 7 to approximate or equal the corresponding dimensions of the vessel 22 and the rim 2. The gripping elements 7 may be fixed relative to one another in which case the distance between the gripping elements 7 is somewhat less than the distance between the sections of the rim 2 which are engaged by the gripping elements 7. The pressure applying means 1 must then be mounted on the vessel 22 by moving it towards the vessel 22 from the side.

It is further possible for the gripping elements 7 to be movable towards and away from one another. This may be accomplished, for example, by designing the web 8 as a telescoping device and providing locking means for locking the web 8 in any of a plurality of telescoped positions. On the one hand, this makes it possible to conform the pressure applying means 1 to vessels of different dimensions. On the other hand, this makes it possible to mount the pressure applying means 1 on the vessel 22 from above. Thus, when the means 1 is to be mounted on the vessel 22, the gripping elements 7 are moved away from one another to such an extent that they clear the rim 2 as the means 1 is moved downwards towards the vessel 22. Once the gripping elements 7 have passed by the rim 2, the gripping elements 7 are moved towards one another until the distance between them is smaller than the distance between the corresponding sections of the rim 2. The gripping elements 7 are now able to engage the rim 2 from below.

As shown in FIG. 2, it is further possible to connect one or both legs 19 of the frame 6 to the web 8 by means of a hinge 20. The longitudinal axis of the hinge 20, which constitutes a pivot axis, is horizontal and parallel to the longitudinal axes of the gripping elements 7 and hence to the sections of the rim 2 engaged by the gripping elements 7. The hinge 20 permits the corresponding leg 19 to be pivoted towards and away from the other leg 19. This again makes it possible to mount the pressure applying means 1 on the vessel 22 from above. Thus, when the means 1 is to be mounted on the vessel 22, at least one of the legs 19 is pivoted away from the other until the clearance between the gripping elements 7 is greater than the distance between the sections of the rim 2 to be engaged by the gripping elements 7. Once the gripping elements 7 have passed by the rim 2, the legs 19 are returned to the positions of FIG. 2 so that the gripping elements 7 may engage the rim 2 from below.

A roller 21 is mounted on each of the legs 19 above the respective gripping element 7. Each of the rollers 21 defines a gap with the corresponding gripping element 7 and the rim 2 of the vessel 22 is received in the gaps between the rollers 21 and the gripping elements 7. The rollers 21 prevent the pressure applying means 1 from dropping off the vessel 22 after the means 1 has been mounted on the vessel 22 but before the adjusting mechanism 3 has been connected to the frame 6 and/or before the clamping element 11 has been tightened. In operation, the pieces 23 of meat are placed in the vessel 22 so as to form a stack of the pieces 23 therein. The cover 24 is then placed on top of the stack. The pressure applying means 1, with or without the adjusting mechanism 3, is now mounted on the vessel 22 so that the rim 2 is confined between the rollers 21 and the gripping elements 7. The adjusting mechanism 3 is connected to the frame 6 if this was not done prior to mounting of the means 1 on the vessel 22.

The clamping element 11 is loosened so that the guide rod 10 of the pressurizing member 5 is free to move in the guide 9. The lever 17 is manipulated in the manner indicated by the double-headed arrow A so that the shifting element 14 is brought to bear against an abutment 13 on the pressurizing member 5. Manipulation of the lever 17 is continued thereby causing the shifting element 14 to press the pressure applying member 12 against the cover 24. This results in pressurization of the stack of pieces 23. When the pressure on the pieces 23 is sufficiently high, the clamping element 11 is tightened thereby fixing the pressure applying member 12 in position. The adjusting mechanism 3 may now be removed if desired and used to pressurize another vessel.

Since the pressure applying member 12 is fixed in position, the pieces 23 remain under pressure. The vessel 22 serves to store or preserve the pieces 23 until these are required. One or more of the pieces 23 may be withdrawn from the vessel 22 at any time by loosening the clamping element 11 so that the cover 24 may be removed. After the desired number of pieces 23 has been withdrawn from the vessel 22, the pieces 23 remaining in the vessel 22 may be pressurized once more by again mounting the adjusting mechanism 3 on the frame 6.

The pressure applying means 1 makes it possible to obtain controlled pressurization of the pieces 23 regardless of the level to which the vessel 22 is filled. Proper pressurization is important to both the quality of the meat and the length of time for which the meat can be stored. If the pressure is too great, an excessive amount of juice will be forced out of the meat thereby causing weight loss as well as a reduction in quality. On the other hand, the pressure should not be too low since, according to the invention, the stack of pieces 23 is preferably essentially free of internal voids when the vessel 22 is used for the storage of boned meat. In other words, the individual pieces 23 of the stack preferably lie against one another in such a manner that virtually no gaps exist between neighboring pieces 23.

In order to minimize the number of voids in the stack of pieces 23, care should be exercised in placing the pieces 23 in the vessel 22. The pieces 23 should be placed in the vessel 22 in such a manner that the number of air spaces between neighboring pieces 23 is minimized, that is, each of the pieces 23 should be in virtually complete surface-to-surface contact with all neighboring pieces 23. Any air spaces which may be present in the stack after the pieces 23 have been placed in the vessel 22 are at least partly eliminated by the weight of the pieces 23. Residual air spaces which are not eliminated by the weight of the pieces 23 should be at least largely eliminated by the pressure applying means 1. The means 1 is particularly effective in eliminating air spaces or voids in the upper part of the stack where the weight of the pieces 23 is not as great as in the lower part of the stack.

It is further preferred for the interface between the vessel 22 and the stack of pieces 23 to be substantially free of voids or air spaces. In other words, the pieces 23 adjacent the walls of the vessel 22 are preferably in virtually complete surface-to-surface contact with the walls of the vessel 22.

By storing the pieces 23 in substantially complete surface-to-surface contact with practically no air spaces between neighboring pieces 23, the stack of pieces 23 may, for all practical purposes, be considered to constitute a single piece of meat. The bottom and sides of the stack are protected by the walls of the vessel 22. In order to protect the upper surface of the stack, the latter is compressed to such an extent by the pressure applying means 1 that juices are squeezed out of the meat in the region of the upper surface of the stack and form a protective layer on the upper surface.

Inasmuch as the stack essentially constitutes a single piece of meat which is virtually free of voids internally as well as at the interface with the vessel 22, the individual pieces 23 do not lie in their own juices. The pressure exerted by the pressure applying means 1 actually prevents the bottom and sides of the stack from being wetted by the juices of the meat and enables the bottom and sides of the stack to remain virtually dry during storage.

Juices from the meat are present essentially only in the region of the upper surface of the stack where these juices form a protective layer on the stack.

As already indicated, the pressurization achieved by the pressure applying means 1 causes the pieces 23 to form a single body of meat for all practical purposes. This makes it possible to lengthen the period for which the pieces 23 are stored. However, in spite of the fact that these pieces 23 act as a single body of meat as far as the ability to be stored is concerned, it is nevertheless possible to readily withdraw individual pieces 23 from the vessel 22 as required by temporarily relieving the pressure. The pieces 23 remaining in the vessel 22 may subsequently be pressurized once more so as to again act like a single body of meat.

It has been found that the pieces 23 at the bottom of the stack may be stored for the longest periods of time. This is at least partly due to the fact that the lowermost pieces 23 are the ones which are best protected from the surroundings. The extended storage capability of the lowermost pieces 23 is of considerable advantage since individual pieces 23 to be withdrawn from the vessel 22 are removed from the top of the stack. Furthermore, it provides greater flexibility in adjusting the storage time relative to the expected rate of removal of the pieces 23 from the vessel 22.

Storage of the pieces 23 under pressure and substantially in the absence of voids provides the advantage that the pieces 23 may be stored compactly. This reduces the amount of storage space required and thus enables storage costs to be markedly reduced.

Referring now to FIG. 3, the same reference numerals as in FIGS. 1 and 2 have been used to identify like elements. FIG. 3 illustrates a storage vessel 22 which, in contrast to the vessel 22, is provided with cooling means.

The vessel 22 is normally or can be stored in a cooling chamber during storage of the pieces 23. Such a cooling chamber may, for example, have a temperature of 2° C. The pieces 23 are removed from the vessel 22 and the cooling chamber as required and, if necessary, are temporarily stored in the selling area of the store. The cooling means of the vessel 22a makes it possible to install the vessel 22a directly in the selling area. Among other things, this improves access to the pieces 23. Furthermore, the cooled vessel 22a makes a separate cooling chamber unnecessary.

The vessel 22a is double-walled and includes an inner wall or layer 26 and an outer wall or layer 27. The inner wall 26 and the outer wall 27 are located at a distance from one another and cooperate to define a space. A conduit 25 for a cooling fluid is disposed adjacent the inner wall 26 in the space between the walls 26 and 27, i.e. the conduit 25 is disposed adjacent that surface of the inner wall 26 which faces away from the interior of the vessel 22a. The conduit 25 may, for example, be in the form of a cooling coil. Thermal insulation 28 is disposed between the conduit 25 and the outer wall 27.

The inner wall 26 is advantageously composed of stainless steel but good results are also obtained if the inner wall 26 is composed of a synthetic resin. The outer wall 27 is, as a rule, composed of a synthetic resin.

The design of the vessel 22a makes it possible to achieve good heat transfer between the interior of the vessel 22a and the cooling fluid in the conduit 25. Thus, as mentioned previously, the conduit 25 is disposed immediately adjacent the inner wall 26. On the other hand, the thermal insulation 28 and the outer wall 27 of the synthetic resin form a thermal barrier which reduces heat transfer between the conduit 25 and the surroundings. It is to be mentioned that the presence of thermal insulation 28 is advantageous but that the thermal insulation 28 could be omitted.

A conventional refrigerating system 29 is located at the bottom of the vessel 22a. The refrigerating system 29 removes heat from the cooling fluid which has circulated through the conduit 25 and has thus become heated and returns the cooled fluid to the conduit 25. The refrigerating system 29 communicates with the conduit 25 via pipes 30.

The refrigerating system 29 may be situated at locations other than the bottom of the vessel 22a. For instance, the refrigerating system 29 may be disposed at the rear of the vessel 22a.

As shown in FIG. 3, the interior of the vessel 22a which accommodates the pieces 23 has a frustoconical or a similar cross section. The arrangement is such that the cross-sectional area of the interior of the vessel 22a decreases in a direction from the open top to the bottom wall of the vessel 22a. By virtue of this design, a certain amount of pressure is already applied to the pieces 23 from the sides when the pieces 23 are placed in the vessel 22a. This contributes to the elimination of voids or air spaces between neighboring pieces 23.

As mentioned previously, the pressure applying means 1 preferably exerts so much pressure on the stack of pieces 23 that juices are squeezed out of the pieces 23 in the region of the upper surface of the stack and form a protective layer on the upper surface. FIG. 3 illustrates that only a small amount of the juices need be squeezed out of the pieces 23 and, in particular, just enough to cover the upper surface of the stack. In FIG. 3, h1 identifies the level of the upper surface of the stack while h2 identifies the upper surface of the layer of juice on the stack. The level h2 is below the level of the upper surface of the cover 24. The juices constituting the relatively thin layer on top of the stack are virtually the only juices in contact with the stack. If the pieces 23 are carefully placed in the vessel 22a so that neighboring pieces 23 are in substantially full surface-to-surface contact and the pieces 23 adjacent to the inner wall or layer 26 are in substantially full surface-to-surface contact with the inner wall 26, the pressure exerted on the stack may be kept relatively low since essentially no voids or air spaces are present to begin with.

The vessels 22, 22a preferably have rectangular cross sections. The vessels 22, 22a may, for example, have a length of about 93 centimeters and a width of about 57 centimeters. The height of the vessels 22, 22a may be of the order of 83 centimeters. It is also possible to provide vessels 22, 22a having two of the dimensions indicated above while either the length or width is approximately one-half of the preceding length and width. For example, the vessels 22, 22a may have a length of about 57 centimeters and a width of about 46 centimeters rather than a length of about 93 centimeters and a width of about 57 centimeters. By halving the length or width of at least some vessels 22, 22a, it becomes possible to install vessels 22, 22a having different capacities next to one another in a space-saving manner.

It is preferred for the vessels 22, 22a to have rectangular cross sections since this enables several vessels 22, 22a to be installed next to one another compactly. Nevertheless, it is possible for the vessels 22, 22a to have other polygonal configurations. Similarly, the vessels 22, 22a may be circular or may have other rounded configurations.

The vessels 22, 22a are advantageously designed to have capacities of 80 kilograms, 150 kilograms and 300 kilograms.

At least those portions of the apparatus which come into contact with the pieces 23 should be composed of a material which is substantially chemically inert with respect to the pieces 23. Stainless steel is advantageously used for such portions of the apparatus. However, these portions of the apparatus may also be composed of a synthetic resin. If a synthetic resin is employed, it is particularly favorable to use a fiberglass-reinforced synthetic resin.

Experiments indicate that the method and apparatus of the invention permit the storage period for boned, fresh raw meat to be increased approximately three-fold as compared to conventional storage techniques, i.e., as compared to vacuum packaging and suspending the meant in cooling chambers. It was found that, when using the teachings of the invention, pork still had completely satisfactory characteristics and no detectable loss in quality after three weeks of storage; veal still had completely satisfactory characteristics and no detectable loss in quality after four weeks of storage; and beef still had completely satisfactory characteristics and no detectable loss in quality after six weeks of storage. It was also found that meat having a high pH, that is so-called DFD or PSE meat (DFD=Dark-Firm-Dry for beef meat and PSE=Pale-Soft-Exudative for pork meat), can be satisfactorily stored by means of the invention for a substantially longer period of time than in a vacuum package. Furthermore, when DFD or PSE meat was placed in a stack with other meat for storage in accordance with the invention, a certain amount of regeneration of the DFD or PSE meat took place.

The following are among the advantages which may be achieved by employing the techniques of the invention to store meat, that is, by storing meat under pressure in containers with neighboring slabs of meat in substantially full surface-to-surface contact:

1. Substantially increased storage periods.
2. Less weight loss.
3. Better meat color even after extended storage periods.
4. No development of a sour taste.
5. Accelerated attainment of the desired degree of aging.
6. Reliable aging of the meat with only small losses.

Additionally, it is possible to construct the vessel in the form of a standardized container, e.g., for a transport by ship.

The amount of juice which is squeezed out of the meat can be used as an indicator to achieve the correct degree of pressurization.

The pressure applying means 1 renders it possible to achieve controlled pressurization even when the level to which the vessel is filled changes due to removal of some of the perishables. Thus, it is possible to constantly remove any desired amount of perishables from a supply which equals or approximates the amount expected to be required over the storage period with no adverse effects upon the perishables. The movable pressure applying member 24 permits the pressure to be adjusted with a high degree of accuracy and reproducibility. Suitable gauges can be used to (directly or indirectly) indicate the extent of pressurization of material below the cover. Such gauges can be calibrated to indicate the optimum degree of pressurization for different types of perishables, e.g., for pork, beef veal and other types of meat.

The vessel can be mounted on wheels to facilitate transport between a shop and a cooling chamber.

The vessel 22 of the apparatus which is shown in FIGS. 1 and 2 is made of a metallic material, particularly a special high-quality steel. This can present problems when the vessel must be cooled, e.g., from room temperature to a temperature of between 2° and 5° C., because the shrinkage of the vessel is less pronounced than that of the meat therein. In other words, the pressure in the interior of the vessel decreases. Furthermore, the temperature of the vessel is likely to fluctuate within a rather wide range, for example, if the vessel is stored in a cooling chamber overnight but is maintained in the shop during business hours so as to afford immediate access to stored meat. A vessel which is made of steel cannot compensate for temperature-induced volumetric changes of meat for longer periods of time because its elasticity decreases with time. Still further, when a vessel which is made of steel is subjected to rapid and pronounced cooling, the interior of the vessel is likely to gather condensate which could affect the quality of stored meat and the output.

Figure 4:
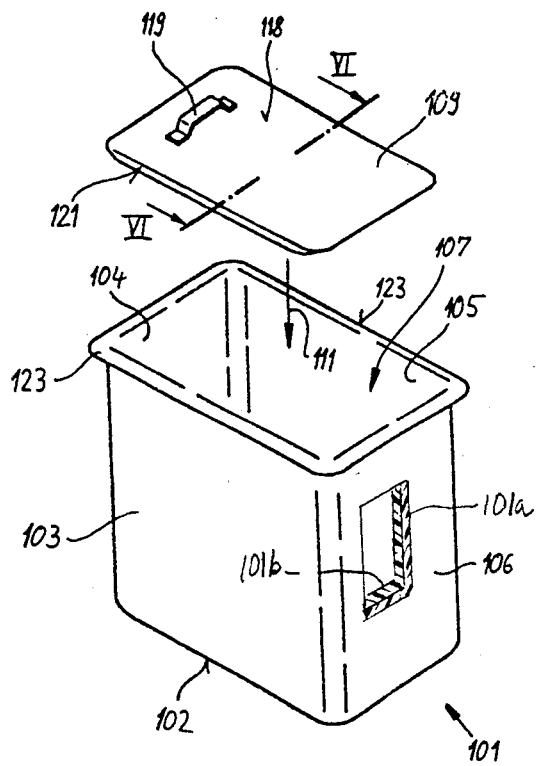
FIG. 4 is a perspective view of a further vessel and of a detachable cover therefor, a portion of the cover being broken away.
Figure 5:
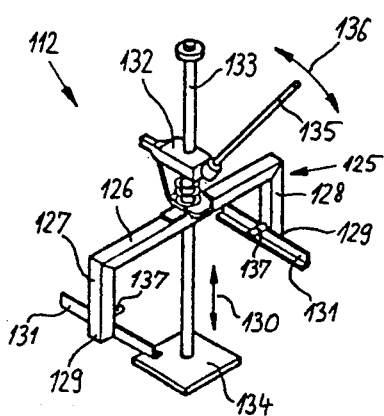
FIG. 5 is a perspective view of pressure applying means for use in conjunction with the vessel and cover of FIG. 4.

FIGS. 4 and 5 show a modified apparatus which is designed to avoid the just enumerated drawbacks or deficiencies of metallic vessels under certain conditions of use, particularly in establishments wherein the vessel is repeatedly cooled and heated, e.g., on a daily basis. The apparatus of FIGS. 4 and 5 employs a vessel 101 which is designed to ensure that the pressure therein is at least substantially constant, regardless of the temperature of the vessel, and which is also less likely to permit the accumulation of condensate. The vessel 101 is made of a material having an elasticity and a thermal expansion coefficient such that it can expand or contract to an extent which is required to fully or practically completely compensate for any shrinkage or expansion of meat in the interior of the vessel. Furthermore, the material of the vessel exhibits a relatively low heat conductivity. The presently preferred material is a plastic, particularly a plastic which is reinforced by glass fibers, which exhibits highly satisfactory elastic characteristics when its temperature changes, and which has a relatively low heat conductivity. Any cooling of the improved vessel 101 and of its contents progresses slowly so as to practically exclude the possibility of accumulation of condensate in its interior in response to cooling. Moreover, when in a cooling chamber, the vessel 101 exerts a pressure upon its contents (it tends to reduce the volume of the meat which is confined in its interior). This is due to the fact that the vessel 101 expands elastically in response to the application of pressure to its contents and remains in prestressed condition (i.e., it tends to contract), and also because the heat expansion coefficient of the material of the vessel is selected with a view to ensure that any cooling of the vessel entails a shrinkage which is more pronounced than the shrinkage of meat therein. This not only reduces the likelihood of development of gaps between the internal surface of the vessel and the adjacent pieces of meat but actually promotes additional expulsion of air (if any) from between the pieces of meat in the vessel so that the expulsion of air can proceed for several days in response to cooling of the vessel. In other words, as the shrinkage of the vessel progresses in response to cooling (such shrinkage can progress for several days), the vessel exerts a progressively increasing pressure upon the confined perishables to even further reduce the likelihood of contamination as a result of contact with entrapped air because such air is being expelled not only in immediate response to cooling of the vessel but for an extended interval thereafter. This results in the ability of the improved apparatus to safely store pieces of meat or like perishables for even longer periods of time because the danger of maintaining the confined perishables in long-lasting contact with oxygen in the entrapped air is practically nil.

The vessel 101 which is shown in FIG. 4 has a rectangular cross-sectional outline and includes a bottom wall 102, four upright sidewalls 103, 104, 105, 106 and an open top which allows for insertion and removal of meat as well as for insertion or removal of a cover 109. The internal space of the vessel 101 is denoted by the character 107, and the arrow 111 denotes the direction in which pieces of meat (not shown in FIG. 4) and the cover 109 can be inserted into the space 107. The means 112 for applying pressure to the cover 109 upon insertion of the cover into the space 107 at a level above the perishables is shown in FIG. 5. The area of the cover 109 is slightly smaller than the area of the space 107 so that the cover is receivable between the walls 103-106 with a certain amount of clearance, i.e., the cover is spaced apart from at least one of the sidewalls when it rests on the topmost layer of meat or the like in the space 107. This provides a path for expulsion of air as well as for the juices to rise above the topmost layer of meat below the cover 109 in response to the application of pressure acting on the cover 109 in the direction of arrow 111.

As mentioned above, the vessel 101 is made of a material which has an optimum elasticity and an optimum heat expansion coefficient to compensate for temperature-induced shrinkage or expansion of the perishables in the space 107 regardless of whether the vessel 101 is heated or cooled, i.e., regardless of whether the vessel is caused to expand or contract. As also mentioned above, the material of the vessel 101 preferably exhibits a low heat conductivity. Still further, the material of the vessel 101 (preferably a plastic material which is reinforced by glass fibers) should exhibit a highly satisfactory mechanical stability so that it can readily stand the stresses which develop as a result of storage of a large quantity of perishables in the space 107 as well as a result of the application of pressure by the pressure applying means 112 and/or as a result of changes in temperature. In accordance with a presently preferred embodiment, the vessel 101 comprises an outer layer 101a of polyester resin and glass fiber mats and an inner layer 101b which is applied to the inner side of the outer layer and is a plastic on the polyester resin basis with admixed coloring agents (if necessary). For example, the material of the vessel 101 can contain approximately 60% by weight of a polyester resin, approximately 30% by weight of glass fiber mats and approximately 10 percent by weight of an inner layer. A vessel which is made of such materials can be readily cleaned, is sanitary and is neutral to the stored perishables while exhibiting a satisfactory mechanical strength so that it can stand pressures of up to 0.04 kg/cm$^2$ (or even higher), without developing cracks, fissures or other defects.

The basic material of the vessel 101 is a polyester resin on the basis of orthophthalic acid polyester resin with 35% monostyrene having a viscosity of 1,000 mp in admixture with 0.8 to 1% of a cobalt accelerator consisting of a solution of styrene with 1% cobalt naphthenal, and approximately 2% of a hardener consisting of methylethylketone peroxide such as a normally active solution of approximately 9% activated oxygen dissolved in a phlegmatising agent, phthalic acid ester and a glycol derivative. The reinforcing means can include endless glass fiber mats with a weight of between 450 and 600 g/m$^2$. The nominal diameter of the glass fibers is or can be in the range of 15$\mu$. The inner layer can be made of isophthalic acid polyester resin with standard glycol and dispersed silicic acid in addition to monostyrene and color pigments of titanium oxide as well as the aforementioned quantities of cobalt accelerator and hardening agent.

It has been found that a vessel which is made of the above described plastic material with reinforcing means of glass fibers exhibits a highly satisfactory ability to expand and contract in response to temperature changes without fatiguing for long periods of time. By way of example, a vessel for storage of 80 kg meat at 18° C. has a height of 620 mm, a width of 470 mm and a length of 580 mm. When the vessel is empty, the length of its circumference at a level of 25 cm above the floor level is 163.5 cm. When the vessel is filled with meat and its contents are pressurized, the circumferential length at the aforementioned level of 25 cm above the floor level is increased to 164 cm (at a temperature of 15° C.), and the circumferential length decreases to 163.5 cm in response to cooling to 3° C. Thus, the pressure in the vessel 101 is amply sufficient to prevent the development of gaps between the pieces of confined meat as well as between the meat and the internal surface of the vessel. This is due to the fact that the vessel is expanded within elastic limits in response to the application of internal pressure at an elevated temperature so that the initial stage of cooling entails a shrinkage of the vessel due to previous expansion within elastic limits followed (if necessary) by a contraction as a result of cooling at a rate which is determined by the heat expansion coefficient of the material of the vessel. The result is a contraction of the vessel at a rate such that the pressure upon the confined material remains constant or even increases as a result of cooling and prolonged storage.

It is clear that the vessel 101 can be furnished in any number of different sizes. It is presently contemplated to supply vessels in sizes for storage of 45 kg, 80 kg, 150 kg and 300 kg of meat or other perishables.

It is preferred to design the vessel 101 in such a way that the cross-sectional area of the space 107 increases in a direction from the bottom wall 102 toward the open top. The cover 109 is preferably congruent to the upper side of the bottom wall 102. Such configuration has been found to allow for a highly satisfactory expulsion of air from the gaps between the confined pieces of meat and also from the gaps between the charge of meat and the internal surface of the vessel. The cover 109 is spaced apart from at least one of the sidewalls 103-106, even if the space 107 accommodates a relatively small quantity of meat or the like, so as to invariably permit for escape of air and for a rise of juices to the desired level. Moreover, the making of the vessel 101 in such a way that the cross-sectional area of the space 107 increases in a direction from the bottom wall 102 toward the open top of the vessel is desirable and advantageous because this allows for convenient withdrawal of the finished vessel from a mold in an extruding or other plastic processing machine which is used to make the vessel.

The material of the cover 109 is or can be the same as that of the vessel 101. It is also possible to make the cover of a high grade steel.

Figure 6A:
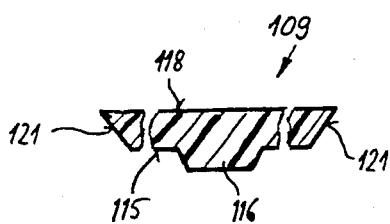
FIG. 6a is an enlarged fragmentary sectional view of the cover, substantially as seen in the direction of arrows from the line VI—VI of FIG. 4.
Figure 6B:
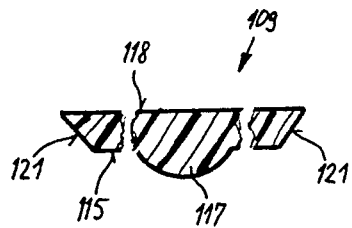
FIG. 6b is a similar fragmentary sectional view of a modified cover.

Expulsion of air from the interior of the vessel 101 at a level below the cover 109 can be enhanced still further by providing the underside 115 of the cover 109 with at least one raised portion or projection (such as the trapezoidal raised portion 116 which is shown in FIG. 6a or a raised portion or projection 117 which is shown in FIG. 6b and has a convex surface facing toward the bottom wall 102 when the cover 109 is inserted into the space 109 above the topmost layer of meat. If the underside 115 is formed with a single projection 116 or 117, such projection is preferably disposed substantially centrally of the cover. Regardless of its exact outline, the projection at the underside 115 of the cover 109 is configurated in such a way that its cross-sectional area decreases in a direction from the open top toward the bottom wall 102 of the vessel 101. It is possible to impart to the entire underside 115 a convex outline (i.e., to enlarge the projection 117 so that it extends all the way to the four edges of the cover 109).

The purpose of the projection 116, 117 or a similar projection is to initially apply pressure to the central part of the confined perishable material so as to expel air in directions toward the inner sides of the sidewalls 103-106 where the expelled air can escape through the clearance between the cover 109 and at least one of the sidewalls.

The upper side 118 of the cover 109 is provided with at least one handle 119. The illustrated handle 119 is located off center and its main purpose is to allow for convenient lifting of the cover 109 out of the space 107 by overcoming the forces which cause the inner side 115 of the cover to adhere to the topmost layer of confined perishables.

It is further preferred to design the cover 109 in such away that its edge faces 121 (see FIGS. 6a and 6b) taper upwardly and outwardly, i.e., from the underside 115 toward the upper side 118. In other words, and if one disregards the projection or projections at the underside 115, the area of the underside is preferably smaller than the area of the upper side 118. Such design of the cover 109 also contributes to a more predictable expulsion of air from the central portion of the space 107 toward the inner sides of the sidewalls 103-106.

The open top of the vessel 101 is surrounded by an outwardly extending reinforced portion or rim 123 which may but need not extend all the way around the open top. For example, the rim 123 can comprise two confronting sections which are provided at the upper ends of the sidewalls 103, 105 or 104, 106. The purpose of the rim 123 is to reinforce the respective portions of the vessel 101 as well as to facilitate rapid, reliable and predictable attachment of the pressure applying means 112. The sections of the rim 123 may but need not extend the full length of the upper edges of the respective sidewalls; e.g., it can suffice to provide a rim including a first section at the upper end of the sidewall 103 midway between the sidewalls 104, 106 and a second section at the upper end of the sidewall 105 midway between the sidewalls 104, 106.

The pressure applying means 112 (see FIG. 5 comprises an inverted U-shaped carrier or frame 125 with a web 126 and two parallel legs 127, 128 extending downwardly from the ends of the web 126. The lower end portions 129 of the legs 127, 128 carry inwardly extending coupling members or grippers 131 (e.g., pieces of profiled rails) which can engage the adjacent sections of the reinforcing rim 123. The means 112 further comprises an adjusting or displacing mechanism 132 in the form of a jack which is secured to the web 126 of the frame 125. The jack 132 comprises a vertical guide rod 133 which is movable in directions indicated by a double-headed arrow 130. The lower end portion of the rod 133 carries a plate-like pressure applying member or piston 134 which can be caused to bear upon the upper side 118 of the cover 109 in order to apply a force which is necessary to expel air from the interior of the vessel 101 below the cover 109 and to cause the juices to rise to a selected level. The illustrated jack 132 is a relatively simple mechanical device which is used to force the cover 109 downwardly toward the bottom wall 102 in response to actuation of a level 135 in directions indicated by a double-headed arrow 136. The exact nature of the means for transmitting motion from the lever 135 to the rod 133 forms no part of the present invention; such motion transmitting means are well known in the relevant art. It is clear that the jack 132 can be replaced with a modified adjusting or displacing device, e.g., a motor-driven aggregate which can be started or arrested and whose operation can be reversed (to lower or to lift the pressure applying member 134) from a suitable control panel, not shown.

The rod 133 extends through an opening (e.g., a bore) which is provided in the web 126 substantially midway between the legs 127, 128 so as to ensure that the pressure applying member 134 acts upon the central portion of the cover 109. The placing of the handle 119 off center renders it possible to use the member 134 as a means for applying pressure to the central portion of the upper side 118 of the cover 109.

The grippers 131 can constitute pieces of profiled rails which are complementary to and can properly engage with the respective sections of the rim 123. The legs 127, 128 preferably further carry guide rollers 137 which are disposed above the respective grippers 131 and can engage the respective sections of the rim 123 from above. The pressure applying means 112 can be slid laterally onto the vessel 101 whereby the guide rollers 137 advance above and the grippers 131 advance below the respective sections of the rim 123 until the (lifted) pressure applying member 134 is located above the central portion of the cover 109. The operator then actuates the lever 137 so as to lower the member 134 and to press the cover 109 in a direction toward the bottom wall 102 to a desired level which suffices to ensure the expulsion of air from the interior of the vessel 101 below the cover 109 as well as to cause juices to rise to a preselected level, particularly to the level as shown in FIGS. 1 and 3.

If desired, at least one of the legs 127, 128 can be pivotally secured to the respective end portion of the web 126 (e.g., by using a hinge corresponding to the hinge 20 of FIG. 2) so as to allow for the application of pressure applying means 112 from above rather than from one side of the vessel 101. The utilization of one or more hinges is desirable and advantageous if the illustrated vessel 101 is closely adjacent one or more additional vessels and/or one or more other bulky or immovable objects (e.g., walls of the building in which the vessel is put to use) so that there is no room for the application of means 112 from one side of the vessel or that the application of means 112 from one side would necessitate a shifting of the vessel and/or of the objects around it preparatory to the application of the grippers 131 to the respective sections of the reinforcing rim 123.

The advantages of the apparatus which employs the vessel 101 and the cover 109 of FIG. 4 are as follows: The vessel exhibits a highly satisfactory mechanical stability and a highly desirable low heat conductivity (i.e., it is a good insulator of heat). Moreover, the vessel is sanitary and can be readily cleaned. Also, the vessel can stand repeated and pronounced temperature changes and is also resistant to chemicals. The vessel does not contain any substances which could harm the operators and/or the consumers of confined perishables.

When the vessel 101 is used for storage of fresh meat, the development of lactic acid as a result of bacterial fermentation will produce a pH of approximately 5.4 which is highly satisfactory and desirable for aging of confined meat. Moreover, it is possible to store pieces of meat having different pH values; the pH values of such meats can vary within a wide range but are equalized in response to storage in the vessel 101.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. Apparatus for temporary storage of pieces of meat which undergo thermally induced expansion and contraction in response to heating and cooling, comprising a vessel having a bottom wall and an open top for admission and withdrawal of meat; a cover which is insertable into the vessel by way of said open top so as to overlie the meat therein; and means for applying pressure to the cover from above so as to pressurize the meat by urging the cover toward the bottom wall of the vessel, said vessel being made of a material having an elasticity and a thermal expansion coefficient such that the pressure which is applied to meat by said cover remains at least substantially unchanged or increases in response to heating or cooling and the resulting thermally induced expansion or contraction of meat therein.

2. The apparatus of claim 1, wherein said pressure applying means comprises a jack.

3. The apparatus of claim 1, wherein said pressure applying means comprises a carrier on said vessel, a pressurizing member mounted on said carrier for movement toward and away from the bottom wall, a pressure applying member cooperating with said pressurizing member and abutting the cover from above when the cover is received in said vessel, and means for moving the pressurizing member relative to the carrier.

4. The apparatus of claim 1, wherein said vessel includes a portion which contacts the meat therein, at least said portion of said vessel consisting of a reinforced plastic material.

5. The apparatus of claim 4, wherein the plastic material of said portion of the vessel is reinforced by glass fibers.

6. The apparatus of claim 1, wherein said vessel comprises means for cooling the meat therein.

7. The apparatus of claim 1, wherein said vessel defines a space for storage of meat and the cross-sectional area of said space decreases in a direction from said open top toward said bottom wall.

8. The apparatus of claim 1, wherein the height of said vessel is approximately 83 cm, the width of said vessel is approximately 57 cm and the depth of said vessel is approximately 46 cm.

9. The apparatus of claim 1, wherein the material of said vessel has a low heat conductivity.

10. The apparatus of claim 1, wherein said vessel contains a plastic material.

11. The apparatus of claim 10, wherein the plastic material of said vessel is reinforced by glass fibers.

12. The apparatus of claim 10, wherein said vessel comprises an outer layer of polyester resin reinforced by glass fiber mats and an inner layer on the basis of polyester resin.

13. The apparatus of claim 12, wherein said inner layer contains pigments.

14. The apparatus of claim 10, wherein said vessel contains approximately 60% by weight of polyester resin, approximately 30% by weight glass fibers and approximately 10% by weight of a cover layer.

15. The apparatus of claim 10, wherein said vessel defines a space for temporary storage of meat and the cross-sectional area of said space decreases in a direction from said open top toward said bottom wall.

16. The apparatus of claim 1, wherein said cover has a side facing the bottom wall of said vessel and at least one substantially centrally located projection at said side.

17. The apparatus of claim 16, wherein said projection has a substantially trapezoidal outline.

18. The apparatus of claim 16, wherein said projection has a convex exposed surface.

19. The apparatus of claim 1, wherein said cover has a side facing away from the bottom wall of said vessel and at least one handle at said side thereof, said handle being located off the center of said cover.

20. The apparatus of claim 1, wherein said vessel has a rim surrounding said open top and including at least two spaced apart reinforced portions, said pressure applying means including means for releasably coupling said carrier to the reinforced portions of said rim.

21. The apparatus of claim 20, wherein said reinforced portions extend outwardly and away from the open top and are disposed opposite each other.

22. The apparatus of claim 1, wherein said pressure applying means comprises a substantially U-shaped frame having an elongated web and two legs extending from the ends of said web and engageable with the vessel in the region of said open top, a pressure applying member, means for connecting said pressure applying member to said frame for movement from above toward and away from the cover in said vessel, and means for moving said pressure applying member relative to said frame.

23. The apparatus of claim 22, wherein said web has a substantially centrally located opening and said connecting means comprises a guide rod operatively connected with said pressure applying member and reciprocable in said opening.

24. Apparatus for temporary storage of pieces of meat, comprising a vessel having a bottom wall and an open top for admission and withdrawal of meat, said vessel including a reinforced portion in the region of said open top; a cover which is insertable into the vessel by way of said open top so as to overlie the meat therein; and means for applying pressure to the cover from above so as to pressurize the meat by urging the cover toward the bottom wall of the vessel, said pressure applying means comprising a carrier on said vessel, a pressurizing member mounted on said carrier for movement toward and away from the bottom wall, a pressure applying member cooperating with said pressurizing member and abutting the cover from above when the cover is received in said vessel, and means for moving the pressurizing member relative to the carrier, said carrier including a substantially U-shaped member having a web and two legs depending from the web and having means for coupling the carrier to said reinforced portion, each of said coupling means comprising a rail arranged to engage the reinforcing portion from below and a rotary member arranged to overlie the reinforced portion at a level above the respective rail.

25. The apparatus of claim 24, wherein said moving means comprises a mounting element on said carrier, a shifting element movably supported by said mounting element and having a portion engaging said pressurizing member and means for moving said shifting element relative to said mounting element.

26. The apparatus of claim 25, wherein said shifting element is separably connected with said mounting element and said pressurizing member has an abutment for said portion of said shifting element, said shifting element having a rod-like second portion which is reciprocable in said mounting element.

27. The apparatus of claim 24, wherein said coupling means conform, at least substantially, to the respective parts of said reinforced portion.

28. The apparatus of claim 27, wherein said vessel includes a portion which contacts the meat therein, at least said portion of the vessel consisting of steel.

* * * * *